(12) United States Patent
Wolfgang et al.

(10) Patent No.: US 8,380,686 B2
(45) Date of Patent: Feb. 19, 2013

(54) TRANSFERRING DATA FROM A PRIMARY DATA REPLICATION APPLIANCE IN A PRIMARY DATA FACILITY TO A SECONDARY DATA REPLICATION APPLIANCE IN A SECONDARY DATA FACILITY

(75) Inventors: John J Wolfgang, Winston-Salem, NC (US); Kenneth F Day, III, Tucson, AZ (US); Philip M Doatmas, Tucson, AZ (US); Henry E Butterworth, Eastleigh (GB); Carlos F Fuente, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 1342 days.

(21) Appl. No.: 11/080,871

(22) Filed: Mar. 14, 2005

(65) Prior Publication Data

US 2006/0206542 A1    Sep. 14, 2006

(51) Int. Cl.
*G06F 17/30* (2006.01)
(52) U.S. Cl. ...................................... 707/695
(58) Field of Classification Search .................. 707/203, 707/695
See application file for complete search history.

(56) References Cited

U.S. PATENT DOCUMENTS

| 5,574,906 | A | 11/1996 | Morris |
| 5,805,787 | A * | 9/1998 | Brant et al. ........................ 714/6 |
| 6,145,012 | A | 11/2000 | Small |
| 6,327,671 | B1 * | 12/2001 | Menon ............................... 714/6 |
| 6,374,250 | B2 | 4/2002 | Ajtai et al. |
| 6,507,898 | B1 * | 1/2003 | Gibson et al. .................. 711/168 |
| 6,615,225 | B1 | 9/2003 | Cannon et al. |
| 6,629,110 | B2 | 9/2003 | Cane et al. |
| 6,823,336 | B1 * | 11/2004 | Srinivasan et al. ................. 707/8 |
| 2002/0116404 | A1 * | 8/2002 | Cha et al. ....................... 707/202 |
| 2003/0149750 | A1 * | 8/2003 | Franzenburg ................. 709/220 |
| 2004/0117571 | A1 * | 6/2004 | Chang et al. ................... 711/162 |
| 2005/0177603 | A1 * | 8/2005 | Shavit ............................ 707/204 |

FOREIGN PATENT DOCUMENTS

JP   7084839 A    3/1995
JP   2005062928 A    3/1995

OTHER PUBLICATIONS

Zhang et al. "On Structural Features of Global Transactions in Multidatabase Systems", Research Issues in Data Engineering, 1993: Interoperability in Multidatabase Systems, 1993. Proceedings RIDE-IMS '93, IEEE, p. 204.*

* cited by examiner

*Primary Examiner* — Amresh Singh
(74) *Attorney, Agent, or Firm* — Dan Shifrin

(57) ABSTRACT

Methods and apparatus are provided for copying data from a primary storage facility to a secondary storage facility which reduce the workload on the storage controller in the primary facility and minimize bandwidth usage. The primary storage facility includes a primary data replication appliance which transfers data to a secondary replication appliance. Updated data from a host is both stored through a storage controller in the primary facility and also received by the primary replication appliance. Logic in the primary replication appliance determines whether the immediately previous version of the data is in a buffer from a previous storage operation. If so, the current (updated) version of the data is compared with the previous version and the difference, such as calculated through a bit-wise exclusive-OR operation, is transferred to the secondary replication appliance. The process is reversed in the secondary replication appliance and the recreated updated version of the data stored in the secondary facility.

12 Claims, 4 Drawing Sheets

TRANSFERRING DATA FROM A PRIMARY DATA REPLICATION APPLIANCE IN A PRIMARY DATA FACILITY TO A SECONDARY DATA REPLICATION APPLIANCE IN A SECONDARY DATA FACILITY

TECHNICAL FIELD

The present invention relates generally to transferring data over a data link and, in particular, to applying a differencing algorithm to reduce data link bandwidth usage during data transfers.

BACKGROUND ART

Remote copying of data is an integral part of disaster recovery for protecting critical data from loss and providing continuous data availability. In a disaster recovery support system, data write updates to a primary or central data store are reproduced at a secondary, remote site. The remote site is typically located at a distance from the primary data store if protection from natural disasters is a concern, but may be adjacent to the primary site if equipment failure is the main concern. In the event of a failure at the primary data store, the remote site can take over all operations, including data write updates, with confidence that no data has been lost. Later, after repair, the primary data store can be restored to the condition of the remote site and can resume all operations, including data write operations.

During remote copying, typically same-sized blocks of data are sent from the primary data store to the remote data site. In this way, data write updates at the primary data store are reproduced at the remote site so as to permit reconstruction of the data, including reconstruction of the exact sequence of data write updates that took place at the primary data store. This reproducibility can be especially important, for example, in a banking system or other transaction log system. Thus, data write updates at the primary data store are collected and are periodically sent to the remote site in a remote copy operation.

The various types of remote copy can require enormous amounts of bandwidth over the data lines between the primary data store and the remote site controller. For example, if a primary data store controller can support 20,000 input/output (I/O) operations per second, and if 50% of these operations are write operations, then the controller can handle 10,000 write operations per second. If each write update involves 4 K bytes, then bandwidth of 40 MB per second is required between the primary controller and the remote site controller. This is a significant amount of bandwidth to provide, given currently available pricing for data lines. Even though asynchronous remote copy can speed up write updates, it does not decrease the amount of bandwidth required.

One proposed system which addresses the issue of bandwidth usage is presented in U.S. Pat. No. 6,327,671 entitled DELTA COMPRESSED ASYNCHRONOUS REMOTE COPY and assigned to the assignee of the present application ("the '671 patent"), which patent is incorporated herein by reference in its entirety. As illustrated in FIG. 1, the system disclosed therein provides a remote copy operation that copies data write updates from a primary data store to a secondary data store by identifying which bytes have changed and sending only the changed bytes from the primary data store to the secondary site. A data operation such as an exclusive-OR (XOR) logic operation can be used to identify the changed bytes. Many data storage systems include XOR facilities as part of their normal configuration, including systems that implement the well-known RAID-type data storage. The XOR operation is used in the '671 patent on the write updated block of data to be copied. Data compression can then be used on the XOR data block to delete the unchanged bytes, and then only the changed bytes are sent to the remote site. This reduces the amount of data being sent between the primary data store and the remote site, and reduces the bandwidth required between the sites. In this way, the remote copy system is said to provide remote copying without requiring a great deal of expensive bandwidth.

SUMMARY OF THE INVENTION

The present invention provides methods and apparatus for copying data from a primary storage facility to a secondary storage facility which reduce the workload on the storage controller in the primary facility and minimize bandwidth usage. The primary storage facility includes a primary data replication appliance which transfers data to a secondary replication appliance. Updated data from a host is both stored through a storage controller in the primary facility and also received by the primary replication appliance. Logic in the primary replication appliance determines whether the immediately previous version of the data is in a buffer from a prior storage operation. If so, the current (updated) version of the data is compared with the previous version and the difference, such as calculated through a bit-wise exclusive-OR operation, is compressed and transferred to the secondary replication appliance. The process is reversed in the secondary replication appliance and the recreated updated version of the data stored in the secondary facility.

While the primary appliance is performing these operations, the storage controller may be performing other tasks, including allowing access by the host. Therefore, the operations of the present invention, being performed in the primary replication appliance, do not adversely affect the workload of the storage controller or of the host. Additionally, because the difference between the previous version of the data and the current version, representing only bits which have changed, is typically highly compressible, when it is compressed and transmitted to the secondary replication appliance, bandwidth usage is reduced.

Other features and advantages of the present invention should be apparent from the following description of the preferred embodiments, which illustrates, by way of example, the principles of the invention.

DETAILED DESCRIPTION OF THE PREFERRED EMBODIMENT

Figure 1:
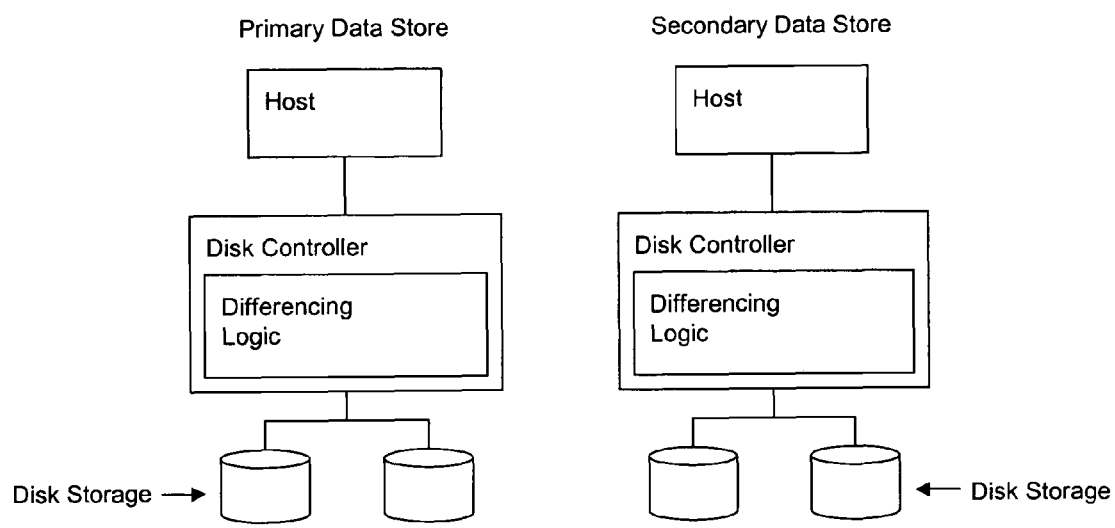
FIG. 1 is a block diagram of a prior art remote copy system.
Figure 2:
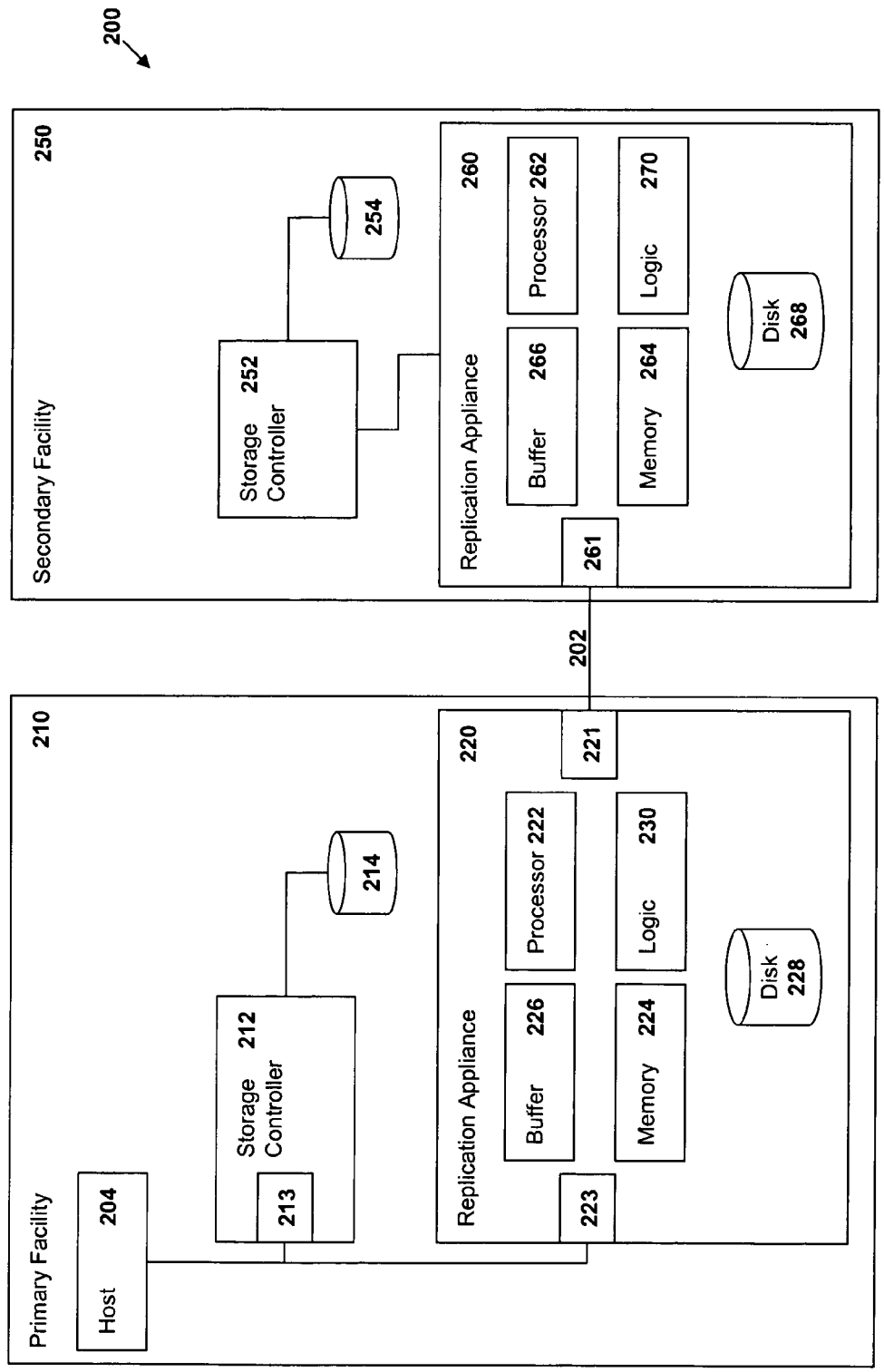
FIG. 2 is a block diagram of a data replication system of the present invention.

FIG. 2 is a block diagram of a data replication system 200 of the present invention. The system 200 includes a primary data facility 210 and a secondary data facility 250. Both facilities 210 and 250 include a storage controller 212, 252 coupled to a data storage device or array 214, 254. Both facilities 210, 250 of the present invention further include a replication appliance 220, 260, interconnected to each other by way of appropriate interfaces 221, 261 directly or through a network, represented by the connection 202. The storage controller 212 and the replication appliance 220 of the primary data facility 210 are operatively coupled through respective interfaces 213, 223 to a host device 204.

The primary and secondary, replication appliances 220, 260 both include: a processor 222, 262; a memory 224, 264 for storage of software instructions to be executed on the processor 222, 262; and a first-in-first-out (FIFO) buffer 226, 266 for temporary storage of data. The appliances 220, 260 also include disk storage 228, 268. Logic 230, 270 for performing the operations of the present invention may reside in the memory 224, 264, in firmware or in a separate processor.

Figure 3:
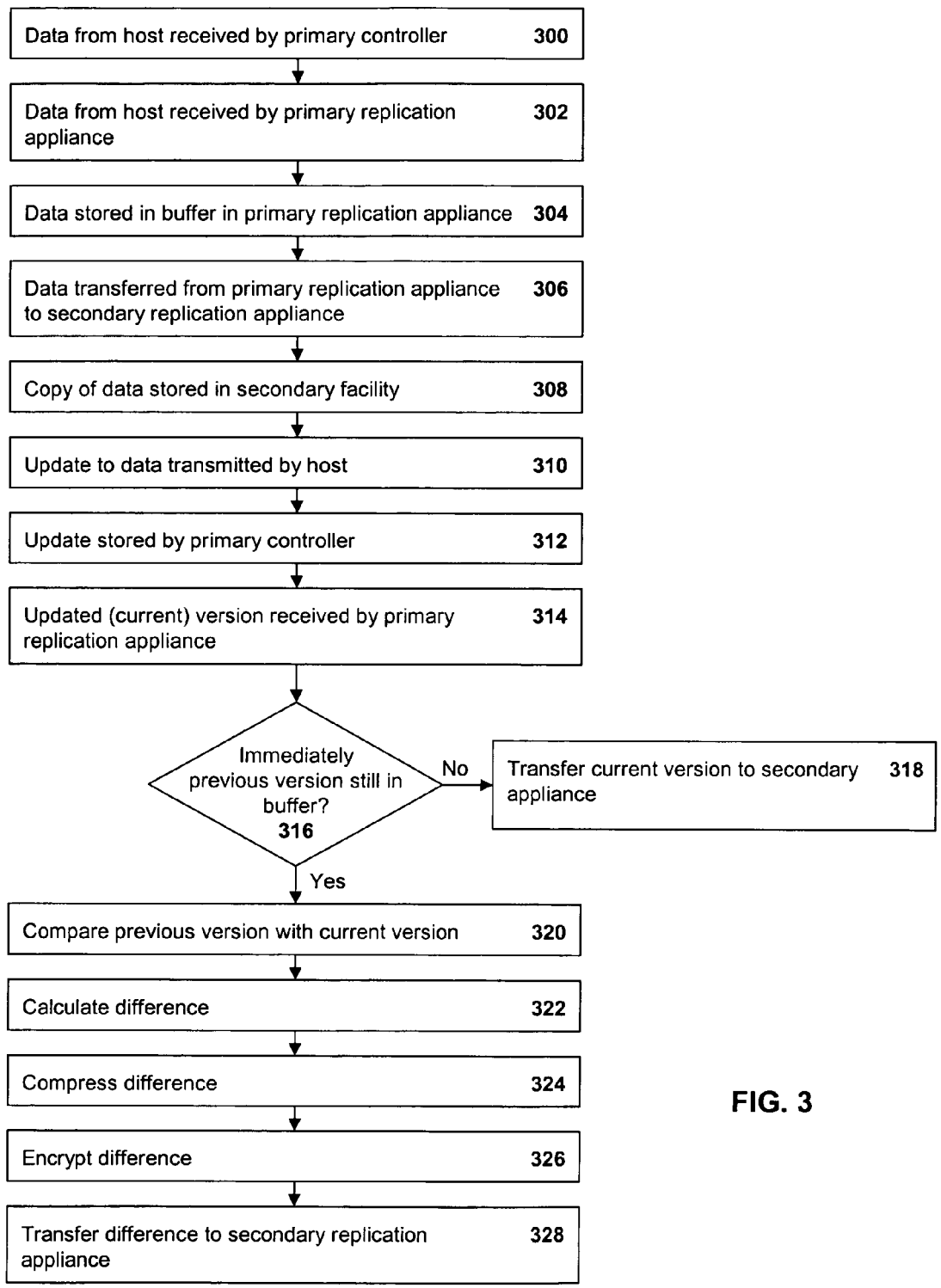
FIG. 3 is a flowchart of the operational steps performed by the primary replication appliance of the present invention.

Referring to the flowchart of FIG. 3, in operation the host 204 sends data to the primary storage controller 212 to be stored in the primary storage device 214 (step 300). The primary replication appliance 220 also receives the data (step 302), either simultaneously from the host 204 or forwarded by the primary controller 210, and ultimately sends a copy of the data over the connection 202 (step 306) for duplicate storage by the secondary replication appliance 260 (step 308). During the process, the primary appliance 220 temporarily stores the data in the buffer 226 (step 304). As other data is received from the host 204, it is also temporarily stored in the buffer 226. When an update to previously stored data is transmitted by the host 204 (step 310), it is both stored by the primary storage controller 212 (step 312) and received by the primary replication appliance 220 (step 314). Under the direction of the logic 230, the primary appliance 220 determines whether the immediately previous version of the data being updated is still in the buffer 226 (step 316). Depending on the size of the buffer 226 and the amount of time that has passed since the previous version of the data was received, the previous version of the data may not yet have been overwritten in the buffer 226 by other, more recent data. If the previous version of the data is no longer present, the logic 230 directs that the current version be transferred to the secondary replication appliance 260 (step 318).

If the previous version of the data being updated is still present, the logic 230 directs that it be compared with the current (updated) version (step 320). Because of the easy availability and reversibility of an exclusive-OR (XOR) function, preferably a bit-wise XOR operation is performed on the two sets of data to calculate a "difference" (step 322). Other mathematical transformations, or sets of complementary transformations, may be substituted for the XOR operation. An appropriate other set of two transformations includes a first transformation T1 which is performed on the current version of the data and the immediately previous version of the data to generate a new version D. A second, complementary, transformation T2 is subsequently applied to the new version D and the immediately previous version to generate (recreate) the current version. A further property of the second transformation T2 is that, when it is applied to the new version D and the current version, the immediately previous version should be generated (recreated). When the bit-wise XOR operation is used, both transformations T1 and T2 are the same. As used herein, the term "difference" will refer to the new version D which is the result of any such transformation T1.

Once generated or calculated, the difference is compressed (step 324) to reduce its size. Subsequently, the compressed difference is transferred to the secondary replication appliance 260 (step 328). While the primary appliance 220 is performing these operations, the primary storage controller 212 may be performing other tasks, including allowing access by the host 204. Therefore, the operations of the present invention, being performed in the replication appliance 220, do not adversely affect the workload of the primary storage controller 212 or of the host 204. Additionally, because the typically highly compressible difference between the previous version of the data and the current version, representing only bits which have changed, is compressed and transmitted to the secondary replication appliance 260, bandwidth usage is reduced.

At the direction of the logic 230, the difference may be encrypted to improve security before being transferred (step 326). If the previous version of the data was not still in the buffer 226 and the unprocessed current version is to be transferred to the secondary appliance 260, it too may be compressed, encrypted or both before being transferred.

Figure 4:
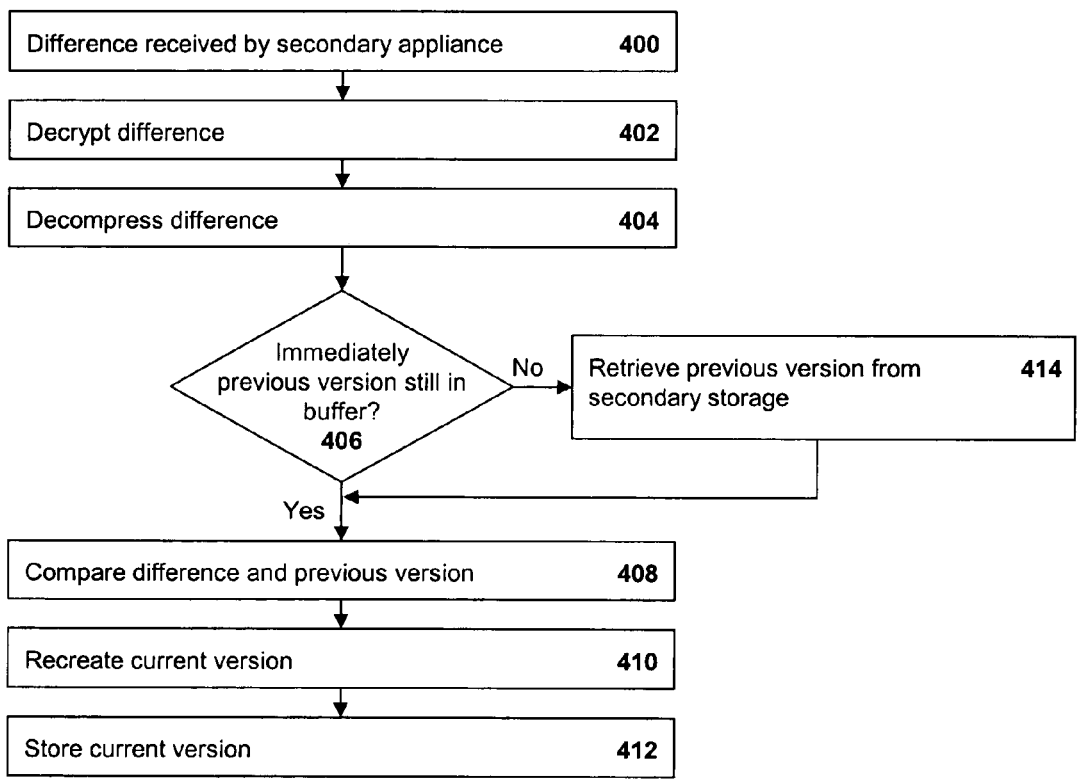
FIG. 4 is a flowchart of the operational steps performed by the secondary replication appliance of the present invention.

Referring to the flowchart of FIG. 4, when the difference is received by the secondary replication appliance 260 (step 400), it is decrypted (step 402) if necessary and decompressed (step 404). The secondary appliance, under the direction of the logic 270, determines whether the previous version of the data is still in the buffer 266 (step 406). If so, the logic directs that the difference and the previous version of the data be compared (step 408), again preferably using a bit-wise XOR to reverse the previous process and recreate the current (updated) version of the data (step 410). The recreated current version of the data is then stored, through the secondary storage controller 252, in the secondary storage 254 (step 412).

If the previous version of the data is not still in the buffer 266 of the secondary replication appliance 260, it must be retrieved from the secondary storage 254 (step 414) before it can be compared with the difference (step 408) to recreate the current version (step 410) and be stored (step 412). If the secondary appliance employs a read_before_write function when storing data, the previous version of the data will first be read from the storage 254 and temporarily stored in a non-volatile memory, which may include the buffer 266. Only after the previous version is hardened in this fashion will the recreated current version overwrite the previous version in the secondary storage 254. Thus, if the overwrite fails, the previous version is still available for recovery. Consequently, no extra step is required by the secondary appliance 260 to obtain the previous version of the data before recreating the current version.

In addition to the savings in bandwidth, the present invention beneficially permits the development and deployment of one logic to direct the process described herein, regardless of what type of storage controller the replication appliance is used with.

It is important to note that while the present invention has been described in the context of a fully functioning system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for copying updated data from a primary storage facility to a secondary storage facility or a method for deploying computing infrastructure comprising integrating computer readable code into a computing system for performing the same.

What is claimed is:

1. A method for copying updated data from a primary storage facility to a secondary storage facility, comprising:
   receiving from a host a current version of data in a primary storage controller and in a primary data replication appliance, both in the primary storage facility;
   determining in the primary data replication appliance if an immediately previous version of the data is stored in a first first-in-first-out (FIFO) buffer in the primary data replication appliance;
   if the immediately previous version of the data is not stored in the first FIFO buffer in the primary data replication appliance, transferring the current version of the data from the primary replication appliance to a secondary data replication appliance in the secondary storage facility;
   if the immediately previous version of the data is stored in the first FIFO buffer in the primary data replication appliance:
      calculating in the primary data replication appliance a difference between the current version of the data and the immediately previous version of the data;
      transferring the calculated difference from the primary data replication appliance to the secondary data replication appliance;
      receiving the difference from the primary data replication appliance at the secondary data replication appliance;
      determining if the immediately previous version of the data, received from the primary replication appliance in a previous transmission of data or recreated in a previous replication operation, is stored in a second FIFO buffer in the secondary data replication appliance;
      if the immediately previous version of the data is stored in the second FIFO buffer, reading the immediately previous version of the data from the second FIFO buffer;
      if the immediately previous version of the data is not stored in the second FIFO buffer, reading the immediately previous version of the data, received from the primary replication appliance in a previous transmission of data or recreated in a previous replication operation, from storage at the secondary data replication appliance;
      recreating the current version of the data in the secondary data replication appliance from the immediately previous version of the data and the received difference; and
      storing the recreated current version of the data in a secondary storage controller attached to the secondary data replication appliance in the secondary storage facility.

2. The method of claim 1, wherein calculating the difference between the current version of the data and the immediately previous version of the data comprises applying a bitwise exclusive-OR to the current version and the immediately previous version.

3. The method of claim 1, wherein storing the recreated current version of the data comprises overwriting the immediately previous version of the data.

4. The method of claim 1, wherein:
   calculating the difference between the current version of the data and the immediately previous version of the data comprises applying a bitwise exclusive-OR to the current version of the data and the immediately previous version of the data; and
   recreating the current version of the data from the immediately previous version of the data and the received difference comprises applying a bitwise exclusive-OR to the difference and the immediately previous version of the data.

5. The method of claim 1, further comprising compressing the difference before transferring the difference from the primary data replication appliance to the secondary data replication appliance.

6. The method of claim 1, further comprising encrypting the difference before transferring the difference from the primary data replication appliance to the secondary data replication appliance.

7. A method for deploying computing infrastructure, comprising integrating computer readable code into a computing system, wherein the code, in combination with the computing system, is configured for performing the following:
   receiving from a host a current version of data in a primary storage controller and in a primary data replication appliance, both in a primary storage facility;
   determining in the primary data replication appliance if an immediately previous version of the data is stored in a first first-in-first-out (FIFO) buffer in the primary data replication appliance;
   if the immediately previous version of the data is not stored in the first FIFO buffer in the primary data replication appliance, transferring the current version of the data from the primary data replication appliance to a secondary data replication appliance in the secondary storage facility;
   if the immediately previous version of the data is stored in the first FIFO buffer in the primary data replication appliance:
      calculating in the primary data replication appliance a difference between the current version of the data and the immediately previous version of the data; and
      transferring the calculated difference from the primary data replication appliance to the secondary data replication appliance;
      receiving the difference from the primary data replication appliance at the secondary data replication appliance;
      determining if the immediately previous version of the data, received in the secondary replication appliance from the primary replication appliance in a previous transmission of data, is stored in a second FIFO buffer in the secondary data replication appliance;
      if the immediately previous version of the data is stored in the second FIFO buffer, reading the immediately previous version of the data from the second FIFO buffer;
      if the immediately previous version of the data is not stored in the second FIFO buffer, reading the immediately previous version of the data, received in the secondary replication appliance from the primary replication appliance in a previous transmission of data, from storage at the secondary data replication appliance;

recreating the current version of the data in the secondary data replication appliance from the immediately previous version of the data and the received difference; and storing the current version of the data in a secondary storage controller attached to the secondary data replication appliance in the secondary storage facility.

8. The method of claim 7, wherein calculating the difference between the current version and the immediately previous version of the data comprises applying a bitwise exclusive-OR to the current version of the data and the immediately previous version of the data.

9. The method of claim 7, wherein storing the recreated current version of the data comprises overwriting the immediately previous version of the data.

10. The method of claim 7, wherein:

calculating the difference between the current version of the data and the immediately previous version of the data comprises applying a bitwise exclusive-OR to the current version of the data and the immediately previous version of the data; and recreating the current version of the data from the immediately previous version of the data and the received difference comprises applying a bitwise exclusive-OR to the difference and the immediately previous version of the data.

11. The method of claim 7, further comprising compressing the difference before transferring the difference from the primary data replication appliance to the secondary data replication appliance.

12. The method of claim 7, further comprising encrypting the difference before transferring the difference from the primary data replication appliance to the secondary data replication appliance.

* * * * *